United States Patent
Hong et al.

(10) Patent No.: US 10,334,657 B2
(45) Date of Patent: Jun. 25, 2019

(54) METHOD AND APPARATUS FOR CHANGING CONNECTION STATE OF UE

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/712,079

(22) Filed: Sep. 21, 2017

(65) Prior Publication Data
US 2018/0092155 A1    Mar. 29, 2018

(30) Foreign Application Priority Data

Sep. 23, 2016 (KR) .......... 10-2016-0122506
Aug. 17, 2017 (KR) .......... 10-2017-0104068

(51) Int. Cl.
*H04W 36/32* (2009.01)
*H04W 76/27* (2018.01)
*H04W 76/28* (2018.01)
*H04W 52/02* (2009.01)
(Continued)

(52) U.S. Cl.
CPC .......... *H04W 76/27* (2018.02); *H04W 36/32* (2013.01); *H04W 48/20* (2013.01); *H04W 52/0254* (2013.01); *H04W 76/28* (2018.02); *H04W 36/30* (2013.01); *H04W 52/0245* (2013.01); *Y02D 70/00* (2018.01); *Y02D 70/1226* (2018.01); *Y02D 70/1262* (2018.01); *Y02D 70/1264* (2018.01); *Y02D 70/142* (2018.01); *Y02D 70/21* (2018.01)

(58) Field of Classification Search
None
See application file for complete search history.

(56) References Cited

U.S. PATENT DOCUMENTS

| | | | |
|---|---|---|---|
| 2017/0245318 A1* | 8/2017 | Rayavarapu | H04W 68/005 |
| 2018/0279407 A1* | 9/2018 | Xu | H04W 36/14 |
| 2019/0014515 A1* | 1/2019 | Zee | H04W 36/08 |

OTHER PUBLICATIONS

NTT DOCOMO, Inc., "UE state transition diagram for NR", R2-164713, 3GPP TSG-RAN WG2 #95, Aug. 22-26, 2016, Gothenburg, Sweden, pp. 1-6.

(Continued)

*Primary Examiner* — Eunsook Choi
(74) *Attorney, Agent, or Firm* — IP Legal Services, LLC

(57) ABSTRACT

Disclosed are a method of changing a connection state according to a movement of a UE and an apparatus for the same. The method of a UE includes: receiving indication information indicating a connection change into a specific RRC state from an evolved NodeB (eNB); configuring a connection state of the UE into the specific RRC state based on the indication information and performing a cell reselection operation according to a movement of the UE; and changing the connection state of the UE into an RRC idle state based on at least one piece of information on whether an RRC resume procedure is initiated, system information of a cell selected by the cell reselection operation, and radio access technology information, wherein the specific RRC state is a state distinguished from an RRC connection state and the RRC idle state.

11 Claims, 6 Drawing Sheets

(51) Int. Cl.
*H04W 48/20* (2009.01)
*H04W 36/30* (2009.01)

(56) References Cited

OTHER PUBLICATIONS

Samsung, Contents of Minimum System Information, R2-165200, 3GPP TSG-RAN WG2 Meeting #95, Gothenburg, Sweden, Aug. 22-26, 2016, pp. 1-4.

* cited by examiner

METHOD AND APPARATUS FOR CHANGING CONNECTION STATE OF UE

CROSS REFERENCE TO RELATED APPLICATION

This application claims priority from Korean Patent Application Nos. 10-2016-0122506 & 10-2017-0104068, filed Sep. 23, 2016 & Aug. 17, 2017.

BACKGROUND OF THE INVENTION

1. Field of the Invention

The present disclosure relates to a method and an apparatus for changing a connection state according to a movement of a UE. More particularly, the present disclosure relates to a method and an apparatus for, when a UE in a light connection or RRC inactive state moves, determining a connection state of the corresponding UE and reflecting the connection state.

2. Description of the Prior Art

As communication systems have developed, various wireless User Equipments (UEs) have been introduced to consumers, such as companies and individuals. A current mobile communication system has affiliated with $3^{rd}$ generation partnership project (3GPP), for example, Long Term Evolution (LTE), LTE-Advanced (LTE-A), and the like. Such a mobile communication system is a high speed and high capacity communication system capable of transmitting and receiving various data, such as image data, wireless data, and the like, beyond providing a voice-based service. The mobile communication system requires technology for transmitting a large amount of data at a high speed as fast as a wired communication network.

Further, due to an increase in UEs using machine-type communication (hereinafter, referred to as "MTC"), data transmission and reception through mobile communication systems have rapidly increased. Meanwhile, in MTC, periodic transmission/reception of a small amount of data is required and a low-power low-cost UE may be used.

Accordingly, there is a demand for technology enabling a plurality of UEs to simultaneously transmit/receive data while reducing power consumption.

Particularly, a UE that periodically or aperiodically transmits a small amount of data is required to change an RRC connection state to transmit the small amount of data. However, for the change in the RRC connection state, a procedure for data transmission/reception between a UE and an evolved NodeB (eNB) and an eNB and a core network was very complicated in a typical method.

Such a transmission/reception procedure causes a relatively high data load compared to the small amount of data that the UE desires to transmit. That is, during the procedure for changing the RRC connection state to transmit the small amount of data, unnecessary data overload may be generated.

Such a problem results in an increasing data load in a total communication system as the number of UEs for periodically transmitting the small amount of data becomes larger.

Accordingly, it is necessary to develop a detailed method and procedure for changing the UE connection state to transmit/receive the small amount of data while not seriously increasing a data load of the total communication system according to a change in the wireless communication environment. Particularly, due to a definition of a new RRC state other than the RRC connection state and the RRC idle state, a detailed connection state change procedure is necessary for the case in which the UE configures the corresponding connection state.

SUMMARY OF THE INVENTION

In the background, an embodiment provides a procedure of changing a connection state according to a movement of the UE when a new UE connection state such as a light connection state or an RRC inactive state is added to an RRC connection state and an RRC idle state.

In accordance with an aspect of the present disclosure, a method of changing a connection state by a User Equipment (UE) is provided. The method includes: receiving indication information indicating a connection change into a specific RRC state from an evolved NodeB (eNB); configuring a connection state of the UE into the specific RRC state based on the indication information and performing a cell reselection operation according to a movement of the UE; and changing the connection state of the UE into an RRC idle state based on at least one piece of information on whether an RRC resume procedure is initiated, system information of a cell selected by the cell reselection operation, and radio access technology information, wherein the specific RRC state is a state distinguished from an RRC connection state and the RRC idle state.

In accordance with another aspect of the present disclosure, a method of controlling a change in a connection state of a User Equipment (UE) by an evolved NodeB (eNB) is provided. The method includes: transmitting information on whether a cell provided by the corresponding eNB supports a specific RRC state through system information; transmitting indication information indicating a state change into the specific RRC state to a UE within the cell provided by the eNB; and configuring the connection state of the UE as the specific RRC state, wherein the specific RRC state is a state distinguished from an RRC connection state and the RRC idle state.

In accordance with an aspect of the present disclosure, a User Equipment (UE) for changing a connection state is provided. The UE includes: a receiver configured to receive indication information indicating a state change into a specific RRC state from an evolved NodeB (eNB); and a controller configured to configure a connection state of the UE as the specific RRC state based on the indication information and perform a cell reselection operation according to a movement of the UE, wherein the controller changes the connection state of the UE into an RRC idle state based on at least one piece of information on whether an RRC resume procedure is initiated, system information of a cell selected by the cell reselection operation, and radio access technology information.

In accordance with another aspect of the present disclosure, an evolved NodeB (eNB) for controlling a change in a connection state of a User Equipment (UE) is provided. The eNB includes: a transmitter configured to transmit information on whether a cell provided by the corresponding eNB supports a specific RRC state through system information and transmit indication information indicating a state change into the specific RRC state to a UE within the cell provided by the eNB; and a controller configured to configure the connection state of the UE as the specific RRC state, wherein the specific RRC state is a state distinguished from an RRC connection state and the RRC idle state.

The present embodiments provide a reduced signaling procedure to the UE that performs a frequent connection state change and clearing an operation procedure in the case in which the UE moves, so as to remove ambiguity while reducing a data load of the total communication system.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
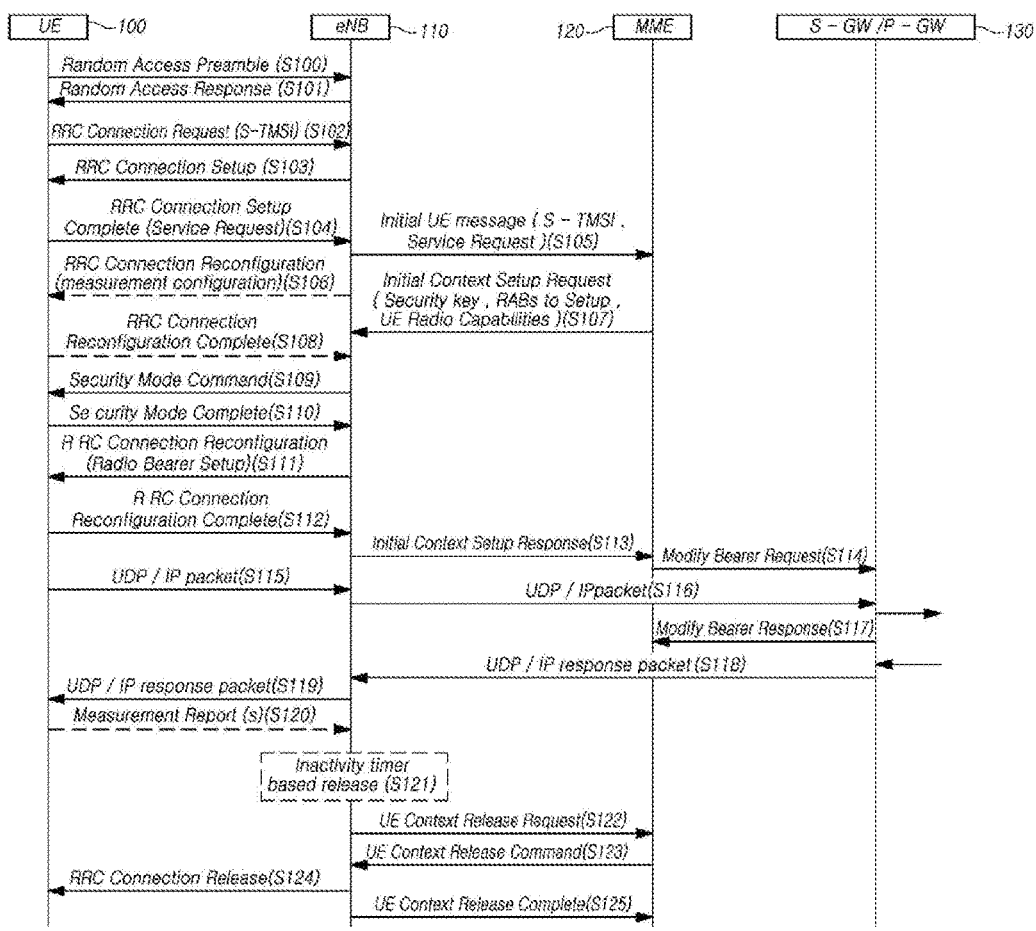
FIG. 1 illustrates message processing orders according to typical LTE technology.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, a machine type communication (MTC) terminal may refer to a terminal that supports low cost (or low complexity), a terminal that supports coverage enhancement, or the like. In the present specifications, the MTC terminal may refer to a terminal that supports low cost (or low complexity) and coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), LTE, high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed. The base station or cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, a base station or a cell may be construed as an inclusive concept indicating a portion of an area covered by a BSC (Base Station Controller) in CDMA, a Node-B in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell. Thus, the base station may be construed in two ways: i) the base station may be a device itself that provides a megacell, a macrocell, a microcell, a picocell, a femtocell, and a small cell in association with a wireless area, or ii) the base station may indicate a wireless area itself. In i), a base station may be all devices that interact with one another to enable the devices that provide a predetermined wireless area to be controlled by an identical entity or to cooperatively configure the wireless area. Based on a configuration type of a wireless area, the base station may be referred to as an eNB, an RRH, an antenna, an RU, a Low Power Node (LPN), a point, a transmission/reception point, a transmission point, a reception point, and the like. In ii), the base station may be a wireless area itself that receives or transmits a signal from a perspective of a terminal or a neighboring base station.

Therefore, the base station may be referred to as a megacell, a macrocell, a microcell, a picocell, a femtocell, a small cell, an RRH, an antenna, an RU, an LPN, a point, an eNB, a transmission/reception point, a transmission point, and a reception point.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present disclosure is applicable.

Uplink transmission and downlink transmission may be performed based on a TDD (Time Division Duplex) scheme or an FDD (Frequency Division Duplex) scheme. In the TDD, Uplink and downlink transmission is performed based on different times. In the FDD, uplink and downlink transmission is performed based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be i) a base station or ii) a macro cell (hereinafter, referred to as an 'eNB') and at least one RRH that is connected to the eNB through an optical cable or an optical fiber and is wiredly controlled. The multi-transmission/reception point has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Connection State Transition Procedure of UE

In typical mobile communication technology, states of a UE and a network are divided into a UE idle state and a connected state. The states of the UE and the network match each other. For example, states (for example, an RRC state and an ECM state) in a wireless network (E-UTRAN) and a core network match each other. That is, when the corresponding UE transitions to an RRC-IDLE state, the network enters an ECM-IDLE state. When the corresponding UE transitions to an RRC-CONNECTED state, the network enters an ECM-CONNECTED state. When the UE in the idle state transmits data, a complicated signaling process illustrated in FIG. 1 should be performed depending on the state of the corresponding UE. Particularly, even when the UE transmits a small amount of data, a large overhead is generated.

FIG. 1 illustrates a procedure of processing messages processing orders according to typical LTE technology.

Referring to FIG. 1, a UE 100 transmits a random access preamble to an eNB 110 to transition from an RRC idle state to an RRC connection state and transmit data in S100. Thereafter, the UE 100 receives a random access response from the eNB 110 in S101, and transmits a request for an RRC connection reconfiguration to the eNB 110 in S102.

The eNB 110 establishes an RRC connection setup in the UE 100 in S103, and the UE 100 reports the completion in S104.

When the RRC connection setup in the UE 100 is completed, the eNB 110 makes a request for service by transmitting an initial UE message to an MME 120 in S105. The MME 120 transmits a request for an initial context setup to the eNB 110 in S107. In S106, the eNB 110 may establish a measurement configuration by transmitting an RRC connection reconfiguration message to the UE 100 between steps S105 and S107. When the measurement configuration is completed, the UE 100 transmits the RRC connection reconfiguration message to the eNB 110 in S108.

The eNB 110 transmits a security mode command to the UE 100 in S109 and receives a response thereto in S110.

Thereafter, the eNB 110 transmits the RRC connection reconfiguration message for a radio bearer setup to the UE 100 in S111 and receives a response thereto in S112. The eNB 110 transmits a response to the initial context setup to the MME 120 in S113, and the MME 120 transmits a bearer modification request to a gateway 130 in S114.

The UE 100 transmits a UDP/IP packet to the eNB 110 in S115, and the eNB 110 transmits the corresponding packet to the gateway 130 in S116. The gateway 130 transmits a response to the bearer modification to the MME 120 in S117, and transmits a UDP/IP packet response to the eNB 110 in S118. The eNB 110 transmits the corresponding packet to the UE 100 in S119.

Through this procedure, the UE 100 transmits the packet to the core network.

Thereafter, the UE 100 transmits a measurement report to the eNB 120 according to the measurement configuration, either periodically or when an event is generated in S120. The eNB 120 determines whether to release the UE 100 based on the measurement report or an inactive timer in S121. When the RRC connection release of the UE 100 is determined, the eNB 110 makes a request for the UE context release to the MME 120 in S122. The MME 120 transmits a UE context release command to the eNB 110 in S123, and the eNB 110 instructs the UE 100 to release the RRC connection in S124.

After the RRC connection of the UE 100 is released, the eNB 110 transmits a response to the MME 120 in S125.

Through the procedure, the RRC-connected UE may transition to the RRC idle state.

As described above, for a transition of the UE from the RRC idle state to the RRC connection state or from the RRC connection state to the RRC idle state, a plurality of signal procedures between the UE and the eNB and between the eNB and the core network were required in the related art. In the procedures, even when the UE periodically transmits a small amount of data, overhead may be continuously generated. Meanwhile, to reduce the overhead according to the state transition, the UE may remain in the connected state. However, in this case, even though there is no data transmission, a network state should be periodically measured according to a measurement configuration and a measurement result should be reported, which causes unnecessary power consumption. Further, when the RRC connection state is maintained, handover signaling overhead due to movement of the UE may increase.

Connection State Transition Procedure for NB-IoT UE

A narrow band IoT UE (NB-IoT UE) may be operated in a fixed state and installed at a particular location or located within a particular range. Due to such a characteristic, the NB-IoT UE and the eNB support a suspend/resume procedure. Through an RRC connection release message, the eNB may make a request for maintaining an AS context to the UE in an RRC_IDLE state. When the UE receives the RRC connection release message including RRC suspend information and transitions to the RRC IDLE state (or before the eNB transmits the message to the UE), the eNB transmits an S1 message that makes a request for the state transition of the corresponding UE to the core network and enters the ECM IDLE state.

The RRC connection resume procedure is used for the RRC-connected transition from the RRC IDLE state to use information previously stored in the UE and the eNB for resuming the RRC connection. When the UE resumes the RRC connection resume procedure and transitions to the RRC-connected state (after the eNB transmits the RRC connection resume message to the UE), the eNB transmits the S1 message that makes a request for state transition of the corresponding UE to the core network and enters the ECM-connected state.

Figure 2:
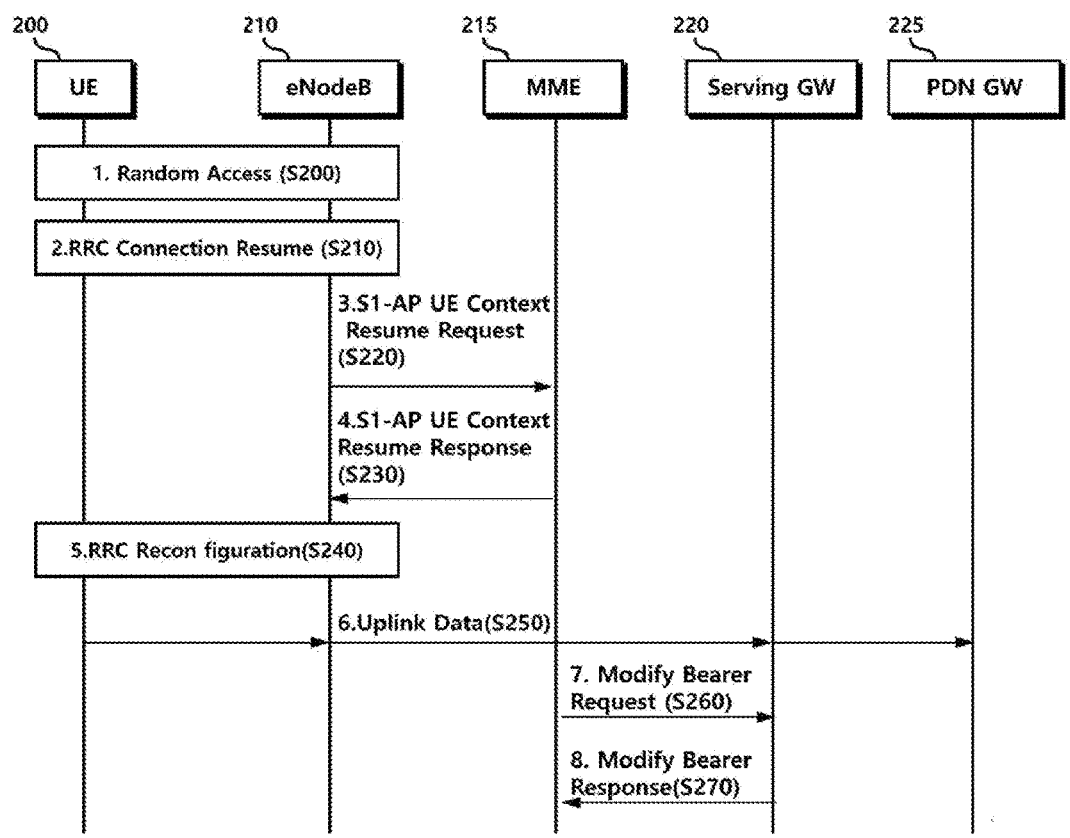
FIG. 2 illustrates a UE initiated connection resume procedure.

FIG. 2 illustrates a UE initiated connection resume procedure according to the prior art.

Referring to FIG. 2, a UE 200 performs a random-access procedure with an eNB 210 in S200. Thereafter, the UE 200 resumes an RRC connection by initiating an RRC connection resume procedure with the eNB in S210.

The eNB 210 transmit an S1-AP UE context resume request to an MME 215 in S220 and receives an S1-AP UE context resume response in S230. When receiving the UE context resume response, the eNB 210 may perform an RRC reconfiguration procedure with the UE 200 and change a connection state of the UE 200 to an RRC connection state.

Thereafter, the UE 200 transmits uplink data to the core network through the eNB 210, the MME 215, a serving gateway 220, and a PDN gateway 225. The MME 215 transmits a modification bearer request to the serving gateway 220 in S260, and the MME 215 receives a modification bearer response from the serving gateway 220 in S270.

Through the above procedure, the UE (for example, NB-IoT UE) may resume the RRC connection and transmit and receive data.

However, in this case, the RRC-connected state and the ECM-connected state are equally made and, accordingly, unnecessary overhead may occur between the eNB and the core network. That is, as described above, the typical mobile communication technology had a signaling overhead problem due to the state transition, and the suspend/resume procedure for the UE at the fixed location to reduce the problem could be applied only to the NB-IoT UE. Accordingly, when the UE escapes from a cell (or eNB) which provides the previously stored AS context, the UE should resume a service request procedure as illustrated in FIG. 1 to transmit uplink data. Further, since the transition of the UE between the suspend state and the resume state is the same as the transition between the IDLE state and the CONNECTED state, core network signaling (S1 signaling) is continuously performed.

To solve the problem, a detailed procedure for transitioning only a wireless network connection state without core network signaling is proposed. In addition, to reflect mobility of the UE, a detailed connected state change procedure according to a movement of the UE for configuring a specific RRC connection state is provided.

Embodiments described below may be applied to a UE using all mobile communication technologies. For example, the present embodiments may also be applied to a next generation mobile communication (for example, 5G mobile communication or New-RAT) UE as well as a mobile communication UE to which LTE technology is applied. For convenience of description, the eNB may denote an eNode-B of LET/E-UTRAN or an eNB (a CU, a DU, or an entity implemented by one logical entity of the CU and the DU) in a 5G wireless network in which the Central Unit (CU) and the Distribute Unit (DU) are separated.

Further, a specific RRC state described in this specification refers to a separate RRC state distinguished from the typical RRC connection state and RRC idle state. For example, the specific RRC state refers to an RRC state in which the eNB stores UE context and supports an RAN initiation paging operation. That is, the RRC state may be divided into the RRC connection state, the RRC idle state, and the specific RRC state. The specific RRC state is only a certain term for defining a new RRC state including the above-described characteristic but is not limited thereto. For example, the specific RRC state may be referred to as a light connection state or an RRC inactive state.

Hereinafter, although the light connection state is described as an example of the specific RRC state as, the RRC inactive state applied to 5G mobile communication technology may be also equally used. Accordingly, this specification mixedly uses the specific RRC state, the light connection state, and the RRC inactive state as necessary, and the light connection state will be mainly described for convenience of description.

Light Connection State

Research on the light connection state for signaling reduction is being conducted in 3GPP. Main functions for a lightly connected UE are as follows:

An S1 connection is maintained within an anchor eNB and is in an active state.

support RAN initiation paging

A paging procedure is controlled by the anchor eNB.

An RAN-based paging area may be UE-specifically configured.

The same mechanism as a cell reselection mechanism of the RRC IDLE state is used when cell reselection-based movement is performed.

UE AS context is maintained in at least one of the UE and the anchor eNB.

ECM state of an MME corresponds to an ECM-CONNECTED state.

As described above, the typical mobile communication technology has the signaling overhead problem due to the state transition, and a study on a specific RRC state (hereinafter, referred to as a light connection state for convenience of description) has been conducted for reducing the signaling overhead. When a lightly connected UE escapes from a paging area, the UE may notify (for example, update the paging area) a network (or an anchor eNB) of it through a corresponding new cell through cell reselection. However, a detailed method and procedure for the light connected UE have not been defined. Accordingly, when the UE moves to the cell that does not support the light connection functions, communication between the lightly connected UE and the network cannot be performed.

An aspect of the present disclosure made to solve the problem is to provide a signaling method and procedure for a lightly connected UE. Particularly, the aspect is to provide an effective processing method when the lightly connected UE moves to a cell that does not support light connection functions.

Figure 3:
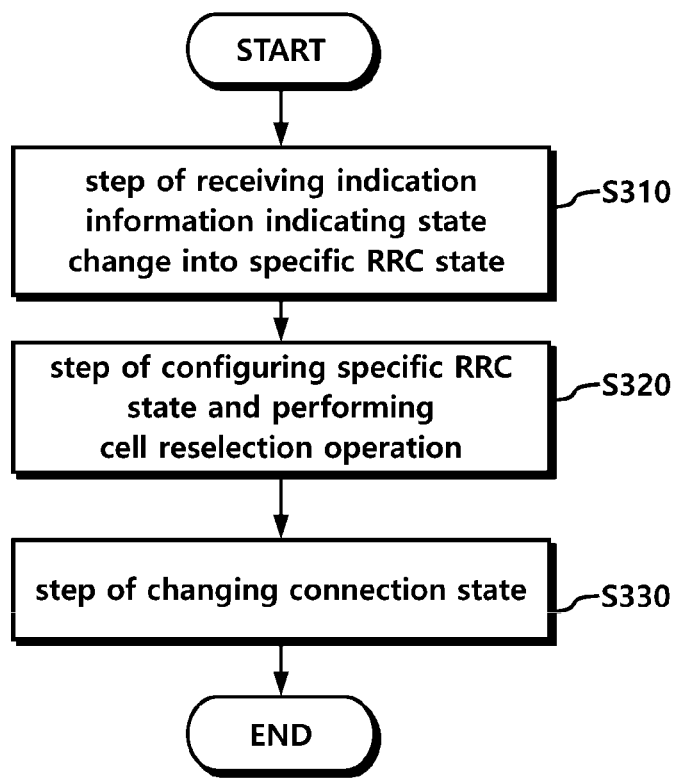
FIG. 3 illustrates a UE operation according to an embodiment.

FIG. 3 illustrates operations of a UE according to an embodiment.

Referring to FIG. 3, in a method of changing a connection state, the UE may perform an operation of receiving indication information indicating a state change to a specific RRC state from the eNB in S310. For example, the specific RRC state is distinguished from an RRC connection state and an RRC idle state and refers to a light connection state or an RRC inactive state in which UE context of the UE is stored and an RAN initiation paging operation is supported.

Meanwhile, the UE may receive indication information indicating a change in a connection state of the UE into a specific RRC state from the eNB. For example, the UE may receive indication information through an RRC message. In this case, the UE corresponds to a UE supporting the specific RRC state and may transmit UE capability information to the eNB in advance, so that the eNB may recognize that the corresponding UE supports the specific RRC state.

Thereafter, the UE may perform an operation of configuring the connection state of the UE as the specific RRC state based on the indication information and performing a cell reselection operation according to a movement of the UE in S320.

For example, the UE having received the indication information indicating the change in the connection state into the specific RRC state from the eNB may change the connection state of the UE into the specific RRC state based on the indication information. For example, the UE may change settings of the UE such that the RRC connection state is changed to the specific RRC state. In another example, the UE may store UE context, support RAN initiation paging, and suspend all SRBs and DRBs to configure the specific RRC state.

Further, the UE may move in the specific RRC state. For example, the UE in the specific RRC state may perform a cell reselection operation according to a movement of the UE. When a radio quality of the cell having configured the specific RRC state deteriorates, the UE may perform the cell reselection operation by evaluating radio qualities of other cells.

The UE may perform a connection state change operation of changing the connection state of the UE into the RRC idle state based on at least one piece of system information of the cell selected by the cell reselection operation and radio access technology information in S330. For example, the UE may change the connection state of the UE from the specific RRC state into the RRC idle state or the RRC connection state according to a movement of the UE.

For example, when the system information does not contain information supporting the specific RRC state, the UE may change the connection state of the UE into the RRC idle state. Specifically, the UE may receive system information of the cell reselected by the cell reselection operation and identify whether the reselected cell supports the specific RRC state based on the received system information. When the reselected cell does not support the specific RRC state, the UE may change the specific RRC state into the RRC idle state. This provides an effect of resolving connection state ambiguity of the UE that may be generated due to non-supporting of the specific RRC state by the reselected cell.

In another example, when radio access technology of the cell selected by the cell reselection operation is different from that of the cell having configured the specific RRC state, the connection state of the UE may be changed to the RRC idle state. Specifically, the UE may identify radio access technology of the reselected cell, and, when the corresponding radio access technology is changed from that of the previously accessed cell, change the connection state of the UE into the RRC idle state. For example, when the cell having configured the connection state as a specific RRC connection uses E-UTRAN-based radio access technology and the cell reselected by the movement uses different radio access technology such as Wi-Fi or 3G, the UE may change the connection state into the RRC idle state.

In another example, when the UE initiates the RRC resume procedure for the transition to the RRC connection state before the cell reselection operation, the UE may change the connection state of the UE into the RRC idle state. Specifically, the UE may perform the RRC resume procedure in order to perform the transition from the specific RRC state to the RRC connection state. For example, when outgoing data (MO data) is generated in the UE in the specific RRC state, the UE may change the state of the UE into the RRC connection state by performing the RRC resume procedure. However, when outgoing data is generated in the UE in the specific RRC state or when the UE having initiated the RRC resume procedure reselects a cell according to a movement of the UE, the UE may change the connection state into the RRC idle state.

Meanwhile, when the UE escapes from an RAN initiation paging area or when system information contains information supporting the specific RRC state, the UE may perform a paging area update. For example, the UE may escape from the RAN initiation paging area of the eNB having configured the specific RRC state according to a movement. In this case, the UE may identify system information of the reselected cell and identify whether the system information contains information indicating the supporting of the specific RRC state. When the reselected cell supports the specific RRC state, the UE may update the paging area. The UE may maintain the specific RRC state as necessary.

Through such a process, even when the UE in the light connection state or the RRC inactive state moves from a cell to another cell, it is possible to remove ambiguity of the UE connection state in consideration of system information of the corresponding cell.

Hereinafter, an eNB operation corresponding to the above-described UE operation will be described with reference to the drawings.

Figure 4:
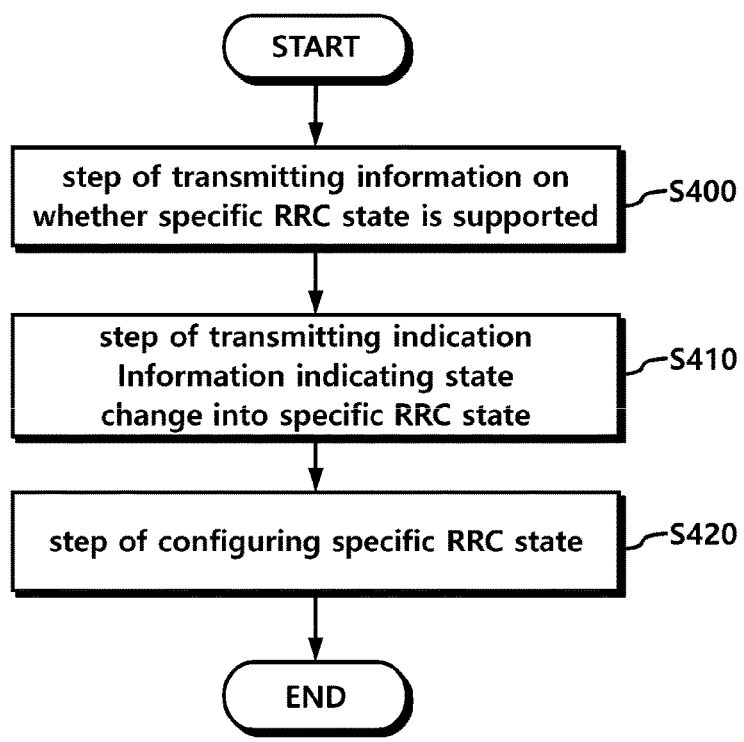
FIG. 4 illustrates an eNB operation according to an embodiment.

FIG. 4 illustrates operations of an eNB according to an embodiment.

Referring to FIG. 4, in a method of controlling a change in a connection state of the UE, the eNB may perform an operation of transmitting information on whether a cell provided by the corresponding eNB supports a specific RRC state through system information in S400. For example, the specific RRC state is distinguished from an RRC connection state and an RRC idle state and refers to a light connection state or an RRC inactive state in which UE context of the UE is stored and an RAN initiation paging operation is supported.

For example, the eNB may transmit information indicating that the cell provided by the corresponding eNB supports the specific RRC state through system information. The UE may receive the system information and thus identify whether the corresponding cell supports the specific RRC state.

The eNB may perform an operation of transmitting indication information indicating a state change into the specific RRC state to the UE within the cell provided by the eNB. For example, the eNB may transmit the indication information through an RRC message. In this case, the eNB may receive UE capability information containing information on whether the UE supports the specific RRC state and thus recognize that the corresponding UE supports the specific RRC state.

The eNB may perform an operation of configuring the connection state of the UE as the specific RRC state in S420. For example, the eNB may change the connection state of the UE into the specific RRC state. For example, the eNB may change settings such that the corresponding UE changes from the RRC connection state to the specific RRC state. In another example, the UE may store UE context, support RAN initiation paging, and suspend all SRBs and DRBs to configure the corresponding UE as in the specific RRC state.

Meanwhile, the UE may move in the specific RRC state. For example, the UE in the specific RRC state may perform a cell reselection operation according to a movement of the UE. When a radio quality of the cell having configured the specific RRC state deteriorates, the UE may perform the cell reselection operation in consideration of states of other cells.

The UE in the specific RRC state may change the connection state of the UE into the RRC idle state based on at least one piece of i) information on whether an RRC resume procedure is initiated, ii) system information of the cell selected by the cell reselection operation, and iii) radio access technology information.

For example, when the system information does not contain information supporting the specific RRC state, the UE may change the connection state of the UE into the RRC idle state. Specifically, the UE may receive system information of the cell reselected by the cell reselection operation and identify whether the reselected cell supports the specific RRC state based on the received system information. When the reselected cell does not support the specific RRC state, the UE may change the specific RRC state into the RRC idle state.

In another example, when radio access technology of the cell selected by the cell reselection operation is different from that of the cell having configured the specific RRC state, the connection state of the UE may be changed to the RRC idle state. Specifically, the UE may identify radio access technology of the reselected cell, and, when the corresponding radio access technology is changed from that of the previously accessed cell, change the connection state of the UE into the RRC idle state. For example, when the cell having configured the connection state as the specific RRC connection state uses E-UTRAN-based radio access technology and the cell reselected by the movement uses radio access technology different therefrom such as Wi-Fi or 3G, the UE may change the connection state into the RRC idle state.

In another example, when the UE initiates the RRC resume procedure for the transition to the RRC connection state before the cell reselection operation, the UE may change the connection state of the UE into the RRC idle state. Specifically, the UE may perform the RRC resume procedure to perform the transition from the specific RRC state to the RRC connection state. For example, when outgoing data (MO data) is generated in the UE in the specific RRC state, the UE may change the state of the UE into the RRC connection state by performing the RRC resume procedure. However, when outgoing data is generated in the UE in the specific RRC state or when the UE having initiated the RRC resume procedure reselects a cell according to a movement of the UE, the UE may change the connection state into the RRC idle state.

Meanwhile, when the UE escapes from an RAN initiation paging area or when system information contains information supporting the specific RRC state, the UE may perform a paging area update. For example, the UE may escape from the RAN initiation paging area of the eNB having configured the specific RRC state according to a movement. In this case, the UE may identify system information of the reselected cell and identify whether the system information contains information indicating the supporting of the specific RRC state. When the reselected cell supports the specific RRC state, the UE may update the paging area. The UE may maintain the specific RRC state as necessary.

As described above, it is possible to provide the specific RRC state in which the occurrence of unnecessary overhead and the time delay attributable to the typical RRC connection state change of the UE can be minimized and define a change procedure of the RRC connection state of the corresponding UE when the UE in the specific RRC state moves to prevent the generation of errors due to UE connection state ambiguity.

Hereinafter, various embodiments of the UE operation and the eNB operation according to a movement of the UE in the specific RRC state will be described in detail. The specific RRC state is described as the light connection state for convenience of description. The term of the specific RRC state includes the RRC active state as described and has not limitation.

As described above, cell reselection may be triggered as the lightly connected UE moves.

When the lightly connected UE moves while escaping from the anchor eNB having configured the light connection state, the anchor eNB cannot know the location of the lightly connected UE. When the anchor eNB configures the light connection state in the UE for tracking of the location of the lightly connected UE by the network, the anchor eNB may instruct the UE to configure a paging area (hereinafter, the paging area configured by the eNB is referred to as the paging area for convenience of description. This is only for convenience of description and other terms having a similar concept may be included in the present disclosure) UE-specifically or cell-specifically through system information. For example, the configuration of the paging area may include information on one or more cells (for example, a cell list) for a paging area ID. For example, cell information may be cell identification information or global cell identification information. Paging area configuration information may include anchor eNB identification information or UE identification information within the anchor eNB.

For example, the paging area configuration information may be indicated through a UE-specific RRC reconfiguration message. In another example, the paging area configuration information may be indicated through a UE-specific RRC release message. In yet another example, the paging area configuration information may be indicated through system information.

When the UE found a more suitable cell based on cell reselection criteria, the UE reselects the cell. Alternatively, the UE reselects the cell and camps on the reselected cell. When the UE escapes the configured paging area (for example, when the reselected cell is not included in at least one piece of paging area information configured in the UE), the lightly connected UE should notify the network of it. For example, a paging area update may be performed. In another example, when the UE does not escape from the configured paging area, the UE maintains cell reselection-related measurement and cell reselection evaluation. When conditions for the cell reselection are met, the UE performs the cell reselection.

Processing Method when a UE Moves to a Cell that does not Support a Light Connection While some cells may support light connection functions (for convenience of description, certain functions for supporting light connection function/capability/feature (RAN paging, X2 paging, light connection state, paging update, network notification, storing/extracting UE context, supporting of cell reselection-based mobility performance, RRC connection resume, and the like) are expressed as the light connection functions. However, it is only for convenience of description and another term can be used.), other cells may not support the light connection functions according to a network construction state. For example, some CSG cells may support the light connection functions, but other CSG cells may not support the light connection functions. In another example, a cell included in an anchor eNB may support the light connection functions, but a cell included in a PLMN different from a PLMN of the cell included in the anchor eNB (a cell belonging to a PLMN id different from a PLMN id of the cell included in the anchor eNB or a cell belonging to a PLMN id different from an equivalent PLMN id of the cell included in the anchor eNB) may not support the light connection functions. In yet another example, in E-UTRAN, some eNBs may support the light connection but other eNBs may not support the light connection. Some eNBs may support the light connection but may not support the light connection in different RAT (for example, UTRAN, GERAN, 2G, 3G, and the like). In another example, some eNBs may support the light connection within E-UTRAN but may not support the light connection in different RAT (for example, UTRAN, GERAN, 2G, 3G, and the like). In another example, when inter-RAT reselection is performed according to a movement of the UE or when the UE selects a different PLMN according to roaming, the lightly connected UE may move to a cell that does not support the light connection.

In the above case, the lightly connected UE may have difficulty in performing communication. For example, since an S1 connection is maintained between an anchor eNB and a core network entity for the lightly connected UE, when downlink data is transmitted to the corresponding UE, the UE may have difficulty in receiving the downlink data. The following embodiments may be used individually or in a combination manner.

1) Method for Triggering, by AS, Transition from UE Connection State to RRC Idle State For one of the above-described reasons or a certain reason, when the lightly connected UE reselects the cell that does not support the light connection (when the UE reselects and camps on the cell), the lightly connected UE may transition to the idle state. The light connection state may be considered as a sub state of the connected state or a state distinguished from the connected state. The typical connected-state UE performed a handover while maintaining the connected state to minimize service disconnection attributable to the cell change. However, when the lightly connected UE performs a cell change in the state in which data transmission is suspended, the lightly connected UE may use the same mechanism as the cell reselection mechanism of the RRC idle state in the state in which data transmission is suspended. Accordingly, it may be preferable to transition the lightly connected UE to the RRC idle state.

For example, the lightly connected UE may recognize that the corresponding cell escapes from a paging area configured by an anchor eNB based on information broadcasted through the reselected cell or information received by synchronization through the corresponding cell. In another example, the lightly connected UE may recognize whether the corresponding cell supports the light connection functions based on information (for example, system information) broadcasted through the reselected cell or information received by synchronization through the corresponding cell.

When the cell reselected by the lightly connected UE does not support the light connection functions, the UE may transition from the light connection state to the RRC idle mode.

For example, the UE may perform one or more of the following operations.

The UE resets MAC.

The UE discards/removes stored UE AS context.

The UE indicates it to a higher layer. Alternatively, the UE informs it to the higher layer along with the cause. Information indicated to the higher layer by the UE may be one piece of information indicating that the RRC connection is released, the lightly connected UE reselects the cell that does not support the light connection functions, and the UE performs a tracking area update.

When a resume procedure or a timer initiated according to an RAN paging update is being operated, the UE stops it.

The UE releases all radio resources including releasing an RLC entity for all configured radio bearers, MAC configuration, and an associated PDCP entity.

The UE transitions to an ECM-IDLE state. Alternatively, the NAS to the ECM-IDLE state.

In another example, when outgoing signaling (MO signaling) or outgoing data (MO data) is generated while the lightly connected UE performs cell reselection, the AS of the lightly connected UE may attempt a connection resume request. When the lightly connected UE reselects the cell that does not support the light connection in the state in which data is buffered in the AS of the UE (when the UE reselects and camps on the cell), the lightly connected UE may return the corresponding data to the higher layer.

In another example, when outgoing signaling (MO signaling) or outgoing data (MO data) is generated while the lightly connected UE performs cell reselection, the AS of the lightly connected UE may attempt a connection resume request. When the lightly connected UE reselects the cell that does not support the light connection in the state in which data is buffered in the AS of the UE (when the UE reselects and camps on the cell), the lightly connected UE may link/map/transmit data to the corresponding AS when the UE transitions the connection mode from the higher layer while keeping the corresponding data.

2) Method of Transmitting System Information to NAS

For one of the above-described reasons or a certain reason, the lightly connected UE may reselect a cell that does not support the light connection. Alternatively, the UE may reselect and camp on the cell.

For example, the lightly connected UE may recognize that the corresponding cell escapes from a paging area configured by an anchor eNB based on information broadcasted through the reselected cell or information received by synchronization through the corresponding cell. In another example, the lightly connected UE may recognize that the corresponding cell supports the light connection functions based on information broadcasted through the reselected cell or information received by synchronization through the corresponding cell. The AS of the UE may forward system information to the NAS. This may be information received through synchronization with a broadcast channel or information received through a request to the eNB by the UE.

For example, the AS of the lightly connected UE (or the UE) may forward NAS system information to the NAS. In another example, the AS of the lightly connected UE (or the UE) may report available PLMN information to the NAS along with associated RAT information.

In another example, the AS of the lightly connected UE (or the UE) may report registration area information (for example, Tracking area code, TAI, tracking area/routing area/location area-related code, identification information, and the like) to the NAS.

In another example, when cell reselection causes a change in system information related to the NAS, the NAS may be informed of it.

In another example, when NAS system information changes, the AS of the lightly connected UE (or the UE) may indicates it to the NAS.

In another example, the NAS having received the system information may transition the UE state into the ECM-IDLE state. For example, the NAS having received specific system information may transition from the ECM-CONNECTED state to the ECM-IDLE state.

3) Method Registering Network/Area

For one of the above-described reasons or a certain reason, when the lightly connected UE reselects a cell that does not support the light connection (when the UE reselects and camps on the cell), the lightly connected UE may perform network registration/area registration.

For example, the lightly connected UE may recognize that the corresponding cell escapes from a paging area configured by an anchor eNB based on information broadcasted through the reselected cell or information received by synchronization through the corresponding cell. In another example, the lightly connected UE may recognize that the corresponding cell supports the light connection functions based on information broadcasted through the reselected cell or information received by synchronization through the corresponding cell.

For example, after transitioning to the idle state, the lightly connected UE may transition to the connected state and perform network registration/area registration.

In another example, the lightly connected UE may transition to the connected state and perform network registration/area registration.

In another example, when the lightly connected UE selects/reselects RAT (UTRAN, GERAN, 2G, 3G, or the like) different from that of the previous cell (or anchor eNB), the UE may perform network registration/area registration. Hereinafter, this operation will be described.

The AS of the UE (or the UE) transmits received system information to the NAS. The NAS of the UE (or the UE) detects that the UE enters a location area that is not included in a list of registration area information registered in the network. The NAS of the UE (or the UE) instructs the AS of the UE to establish the RRC connection for network registration/area registration. The AS of the UE (or the UE) discards stored AS context. For example, when the cell reselected by the lightly connected UE is the cell that does not support the light connection function (when the lightly connected UE recognizes it), the UE may discard stored UE AS context. In another example, when transmitting system information received by the AS of the UE (or the UE) to the NAS, the UE may discard stored UE AS context. In another example, when the AS of the UE (or the UE) indicates establishment of the RRC connection in the higher layer, the UE may discard stored UE AS context.

The UE transmits a location registration (for example, routing area update) request message to a current core network entity (for example, SGSN) through different RAT eNBs (for example, RNC/BSS, and the like). The location registration message may contain information through which a previous core network entity (for example, MME) and the current core network entity may identify the UE. For example, the current core network entity may make a request for UE context to the previous core network entity the information and receive a response through the information. In another example, the current core network entity may instruct the previous core network entity to release an S1 connection maintained by the previous core network entity through the information. Information indicating this may be included. When the information is not included, the S1 connection may be released if the S1 connection is maintained by the MME. In another example, the current core network entity may transmit a context acknowledgement message to the previous core network entity. When the MME maintains the S1 connection with the eNB (anchor eNB), the MME may transmit an S1 Release command message (for example, a UE Context Release Command message) to the anchor eNB to release the S1 connection. When receiving the S1 release command message, the anchor eNB may release all relevant signaling and user data transmission resources. Further, the anchor eNB may transmit an S1 release completion message (for example, a UE Context Release Complete message) to the MME.

In another example, when the UE selects/reselects a cell that does not support the light connection within the same RAT (LTE or New RAT), the UE may perform network registration/tracking area registration (tracking area update). This operation be described below.

For example, the AS of the UE (or the UE) transmits received system information to the NAS. The NAS of the UE (or the UE) detects that the UE enters a location area that is not included in a list of registration area information registered in the network. The NAS of the UE (or the UE) instructs the AS of the UE to establish the RRC connection for network registration/area registration. The AS of the UE (or the UE) discards stored AS context. For example, when the lightly connected UE recognizes that the reselected cell is the cell that does not support the light connection functions, the UE may discard stored UE AS context. In another example, when the AS of the UE (or the UE) transmits the received system information to the NAS, the UE may discard the stored UE AS context. In another example, when the AS of the UE (or the UE) indicates settings of the RRC connection in the higher layer, the UE may discard the stored UE AS context.

In another example, the AS of the UE (or the UE) may recognize that the corresponding cell escapes from the paging area configured by the anchor eNB through the received system information. Alternatively, the AS of the UE (or the UE) may recognize that the corresponding cell does not support the light connection functions. For example, the AS of the UE (or the UE) transmits received system information to the NAS. The NAS of the UE (or the UE) detects that the UE enters a location area that is not included in a list of registration area information registered in the network. The NAS of the UE (or the UE) instructs the AS of the UE to establish the RRC connection for network registration/area registration. The AS of the UE (or the UE) discards stored AS context. For example, when the lightly connected UE recognizes that the reselected cell is the cell that does not support the light connection functions, the UE may discard stored UE AS context. In another example, when the AS of the UE (or the UE) transmits the received system information to the NAS, the UE may discard the stored UE AS context. In another example, when the AS of the UE (or the UE) indicates settings of the RRC connection in the higher layer, the UE may discard the stored UE AS context.

In another example, the UE transmits a location registration (for example, tracking area update) request message to the current core network entity (for example, MME) through the eNB (for example, eNB in the case of an LTE UE) of the same RAT. The location registration message may contain information through which the previous core network entity (for example, old MME) and the current core network entity (for example, new MME) may identify the UE. For example, the current core network entity may make a request for UE context to the previous core network entity based on the information and receive a response. In another example, the current core network entity may instruct the previous core network entity to release an S1 connection maintained by the previous core network entity based on the information. Information indicating this may be included. When the information is not included, the S1 connection may be released if the S1 connection is maintained by the MME. In another example, the current core network entity may transmit a context acknowledgement message to the previous core network entity. When the MME maintains the S1 connection with the eNB (anchor eNB), the MME may transmit an S1 Release command message (for example, a UE Context Release Command message) to the anchor eNB to release the S1 connection. When receiving the S1 release command message, the anchor eNB may release all relevant signaling and user data transmission resources. Further, the anchor eNB may transmit an S1 release completion message (for example, a UE Context Release Complete message) to the MME.

In another example, the UE transmits a location registration (for example, tracking area update) request message to the current core network entity (for example, MME) through the eNB (for example, eNB in the case of an LTE UE) of the same RAT. The location registration message may contain information through which the previous core network entity (for example, old MME) and the current core network entity (for example, new MME) may identify the UE. When the current core network entity is the same as the previous core network entity and the MME maintains the S1 connection with the anchor eNB, the MME may transmit an S1 Release command message (for example, a UE Context Release Command message) to the anchor eNB to release the previous S1 connection. When receiving the S1 release command message, the anchor eNB may release all relevant signaling and user data transmission resources. Further, the anchor eNB may transmit an S1 release completion message (for example, a UE Context Release Complete message) to the MME.

For example, cells that do not support the light connection may be distinguished from cells that support the light connection through different tracking areas.

In another example, the cells that do not support the light connection may be distinguished from the cells that support the light connection through different TAI lists.

In another example, one tracking area may be configured to not include the cell that does not support the light connection and the cell that supports the light connection at the same time.

In another example, one TAI list may be configured to not include the cell that does not support the light connection and the cell that supports the light connection at the same time.

In another example, the paging area of the lightly connected UE may be configured to be the same as the tracking area. For example, when the lightly connected UE escapes from the paging area, the tracking area update is triggered. Accordingly, the S1 connection between the MME and the anchor eNB may be released.

4) Method of Broadcasting Information for Indicating Whether the Cell Supports Light Connection Functions For one of the above-described reasons or a certain reason, the lightly connected UE may reselect a cell that does not support the light connection. Alternatively, the UE may reselect and camp on the cell.

When the lightly connected UE moves to a cell included in the UE-specific (or cell-specific) paging area configured by the anchor eNB through a cell change, the UE may (implicitly) recognize that the corresponding cell supports the light connection functions.

However, when the lightly connected UE moves from the cell included in the lightly connected UE-specific (or cell-specific) paging area configured by the anchor eNB to another cell, the cell may support the light connection functions or may not support the light connection functions.

The eNB may transmit information (for certain information related to the light connection functions) for indicating that the light connection functions (or specific functions of the light connection functions) are supported through system information.

For example, when the lightly connected UE moves from a cell to another cell (when the lightly connected UE escapes the cell included in the lightly connected UE-specific (or cell-specific) paging area configured by the anchor eNB) and the cell broadcast information indicating whether the light connection functions are supported (or information related to the light connection functions) through system information, the UE may initiate the paging area update. For example, the information indicating whether the light connection functions are supported may be explicitly defined and broadcasted. In another example, the UE may receive certain system information related to the light connection functions (system information related to RAN paging, X2 paging, lightly connected state, paging update, network notification, storing/extracting UE context, supporting cell reselection-based mobility performance, RRC connection resume, and the like) and implicitly recognize the information.

In another example, when the lightly connected UE moves from the cell included in the lightly connected UE-specific (or cell-specific) paging area configured by the anchor eNB to another cell and the cell does not broadcast the information indicating whether the light connection functions are supported (or information related to the light connection functions) through the system information, the UE may perform one or more operations according to embodiments of the present disclosure. For example, the UE may transition to the RRC idle state.

5) Method of Indicating an AS Context Maintenance Time when Cell Reselection that does not Support the Light Connection is Performed Cell reselection may continuously occur according to a movement of the lightly connected UE. When the lightly connected UE reselects (reselects and camps on) the cell that does not support the light connection, the UE may reselect (reselect and camp on) again the cell that supports the light connection within a predetermined time. If the lightly connected UE immediately removes stored UE context or transitions to the idle state when reselecting the cell that does not support the light connection, unnecessary signaling may be added. To mitigate the unnecessary signaling, the eNB may indicate a specific timer.

When the lightly connected UE reselects the cell that does not support the light connection, the timer starts. When the UE cannot reselect the cell that supports the light connection until the corresponding time expires, the stored UE context may be removed or the UE may transition to the idle state.

When the UE reselects the cell that supports the light connection until the corresponding time expires, the corresponding timer is stopped or reinitiated.

6) Method of Discarding AS Context Through a Timer or Specific Indication Information If the UE does not transmit/receive data for a comparatively long time when the UE is configured to be in the light connection state by the anchor eNB, the anchor eNB may remove AS context of the corresponding UE. To instruct the lightly connected UE to operate in the idle mode, the anchor eNB may page the lightly connected UE to allow the lightly connected UE to perform an RRC connection resume/setup procedure to transition to the connected state and then transition to the idle mode.

As an example of simplifying such a complicated operation, the anchor eNB may configure a timer to transition the corresponding UE to the idle mode if a predetermined time passes when the anchor eNB configures the UE to be in the lightly connected state. UE or the anchor eNB may perform one or more operations below when the corresponding timer expires.
　transition to RRC IDLE state
　reset MAC
　discard/remove stored UE AS context
　release all radio resources including releasing RLC entity, MAC configuration, and associated PDCP entity for all configured radio bearers.
　indicate it to higher layer
　The UE transitions to the ECM-IDLE state. Alternatively, the NAS of the UE transitions to the ECM-IDLE state. The eNB triggers the release of the S1 connection.

As another example of simplifying the complicated operation, the anchor eNB or the eNB performing paging according to a paging request initiated by the anchor eNB may configure information instructing the corresponding UE to transition to the idle mode on the paging message.

When receiving the corresponding information, the UE may perform one or more operations below.
　transition to RRC IDLE state
　reset MAC
　discard/remove stored UE AS context
　release all radio resources including releasing RLC entity, MAC configuration, and associated PDCP entity for all configured radio bearers.
　indicate it to higher layer
　The UE transitions to the ECM-IDLE state. Alternatively, the NAS of the UE transitions to the ECM-IDLE state. The eNB triggers the release of the S1 connection.

As another example of simplifying the complicated operation, when the UE makes a request for RRC connection resume according to the paging request initiated by the anchor eNB, the eNB may configure information instructing the corresponding UE to transition to the idle mode on a response RRC message of the request.

When receiving the corresponding information, the UE may perform one or more operations below.
　transition to RRC IDLE state
　reset MAC
　discard/remove stored UE AS context
　release all radio resources including releasing RLC entity, MAC configuration, and associated PDCP entity for all configured radio bearers.
　indicate it to higher layer
　The UE transitions to the ECM-IDLE state. Alternatively, the NAS of the UE transitions to the ECM-IDLE state. The eNB triggers the release of the S1 connection.

In another method, the eNB may assign the highest priority of cell reselection to a frequency of the cell that supports the light connection state to increase the possibility to reselect the cell that supports the light connection state.

In another method, when outgoing NAS signaling or MO data is initiated, AS context may be discarded. When NAS signaling or MO data is initiated (RRC connection setup is indicated) by the lightly connected UE from the higher layer for a certain reason, the AS of the UE may initiate an RRC connection setup procedure without initiating an RRC connection resume request. In this case, the UE may discard stored UE context.

Hereinafter, a method of transitioning a Non-Access Stratum (NAS) state and a light connection state of the UE will be described. The following methods will be used individually or mixedly.

For example, as a method of transitioning the NAS state and the light connection state of the lightly connected UE, an individual or a combination of the following methods may be used.

In the case in which the NAS recognizes the light connection state (UE NAS: ECM-CONNECTED, UE AS: RRC-IDLE)

For example, when the light connection is configured in the UE through RRC signaling, the RRC of the UE may indicate the light connection to the NAS. In this case, the NAS of the UE may consider that the UE is in the RRC-IDLE state even though the UE is in the ECM-CONNECTED state. Alternatively, the NAS of the UE may recognize the light connection state. The NAS of the UE maintains NAS context.

When NAS signaling or MO data is triggered in the UE, the NAS/higher layer may indicate transition to the light connection state through AS context in which the RRC is maintained/stored.

In the typical Suspend/Resume procedure for the NB-IoT UE, the RRC Connection Resume Request was initiated by the indication from the higher layer. In the resume of the RRC connection by the indication from the higher layer, a resume cause (resumeCause-r13) included in the RRC Connection Resume Request message has one value of the following establishment causes (EstablishmentCause-NB-r13).

EstablishmentCause-NB-r13::=ENUMERATED {mt-Access, mo-Signalling, mo-Data, mo-ExceptionData, spare4, spare3, spare2, spare1}

To transition the lightly connected UE to the connected state, the corresponding eNB should recognize the corresponding cause to extract UE AS context from the anchor eNB. To identify the cause, for example, the higher layer and/or the RRC Connection Resume Request message may indicate indication information for identifying the cause through one of spare values of the establishment causes (EstablishmentCause-NB-r13) for indicating the resume cause (resumeCause-r13).

In another example of identifying the cause, the higher layer and/or the RRC Connection Resume Request message may indicate the indication information for identifying the cause by defining a field different from the resume cause (resumeCause-r13). Accordingly, the eNB may recognize that the corresponding resume causes are mt-Access, mo-Signalling, mo-Data, and mo-ExceptionData and the triggering of the corresponding resume request message is for transitioning the lightly connected UE to the connected state, which is indicated to extract UE AS context from the anchor eNB. In another example for identifying the cause, the higher layer and/or the RRC Connection Resume Request message may define a field for indicating that the establishment cause of the typical resume cause (resumeCause-r13) and the triggering of the corresponding resume request message are for transitioning the lightly connected UE to the connected state, that is, for extracting UE AS context from the anchor eNB.

In the case in which the NAS recognizes the light connection state (UE NAS: ECM-IDLE, UE AS: RRC-IDLE)

In another example, when the light connection is configured in the UE through RRC signaling, the RRC of the UE may indicate (notify) the light connection to the NAS. For example, the RRC may transmit information indicating the light connection state to the NAS. In this case, the NAS of the UE may consider that the UE is in the ECM-IDLE state or the RRC-IDLE state. It may be noted that the UE is in the light connection state. Alternatively, the NAS of the UE may recognize that the UE is in the light connection state.

The NAS of the UE may perform one or more operations bellow.

The UE maintains NAS context.

The UE stores NAS context.

The UE releases NAS context but stores the NAS context. When NAS signaling or MO data is triggered in the UE, the NAS signaling or MO data is reused/resumed/restored/maintained/invoked.

The UE suspends NAS context. When NAS signaling or MO data is triggered in the UE, the NAS signaling or MO data is reused/resumed/restored/maintained/invoked.

Wen NAS signaling or MO data is triggered in the UE, the NAS/higher layer transmits the NAS signaling or MO data to the RRC. The RRC may transition the UE to the connected state through the maintained/stored AS context.

In the typical Suspend/Resume procedure for the NB-IoT UE, the RRC Connection Resume Request was initiated by the indication from the higher layer. In the resume of the RRC connection by the indication from the higher layer, a resume cause (resumeCause-r13) included in the RRC Connection Resume Request message has one value of the following establishment causes (EstablishmentCause-NB-r13).

EstablishmentCause-NB-r13::=ENUMERATED {mt-Access, mo-Signalling, mo-Data, mo-ExceptionData, spare4, spare3, spare2, spare1}

To transition the lightly connected UE to the connected state, the corresponding eNB should recognize the corresponding cause to extract UE AS context from the anchor eNB. To identify the cause, for example, the higher layer and/or the RRC Connection Resume Request message may indicate indication information for identifying the cause through one of spare values of the establishment causes (EstablishmentCause-NB-r13) for indicating the resume cause (resumeCause-r13).

In another example of identifying the cause, the higher layer and/or the RRC Connection Resume Request message may indicate the indication information for identifying the cause by defining the resume cause (resumeCause-r13) and another field. Accordingly, the eNB may recognize that the corresponding resume causes are mt-Access, mo-Signalling, mo-Data, and mo-ExceptionData and the triggering of the corresponding resume request message is for transitioning the lightly connected UE to the connected state, which is indicated to extract UE AS context from the anchor eNB. In another example for identifying the cause, the higher layer and/or the RRC Connection Resume Request message may define a field for indicating that the establishment cause of the typical resume cause (resumeCause-r13) and the triggering of the corresponding resume request message are for transitioning the lightly connected UE to the connected state, that is, for extracting UE AS context from the anchor eNB.

In the case in which the NAS does not recognize the light connection state (UE NAS: ECM-CONNECTED, UE AS: RRC-IDLE)

In another example, when the light connection is configured in the UE through RRC signaling, the RRC of the UE may not indicate (notify) the light connection to the NAS. In this case, the NAS of the UE considers that the UE is in the ECM-CONNECTED state. The AS (or RRC) of the UE may consider the state as the RRC-IDLE state. The UE (or the AS or RRC of the UE) may recognize the light connection state. When NAS signaling or MO data is triggered, the NAS/ higher layer transmits the NAS signaling or MO data to the corresponding SRB or DRB. When data is transmitted to the SRB/DRB, the RRC may transition to the connected state through the maintained/stored AS context.

In accordance with embodiments of the present disclosure, it is possible to efficiently process communication between the UE and the network based on information on the corresponding cell when the lightly connected UE performs cell reselection through the above-described operation.

Hereinafter, the configuration of the UE and the eNB in accordance with at least one embodiment will be described again with reference to the accompanying drawings.

Figure 5:
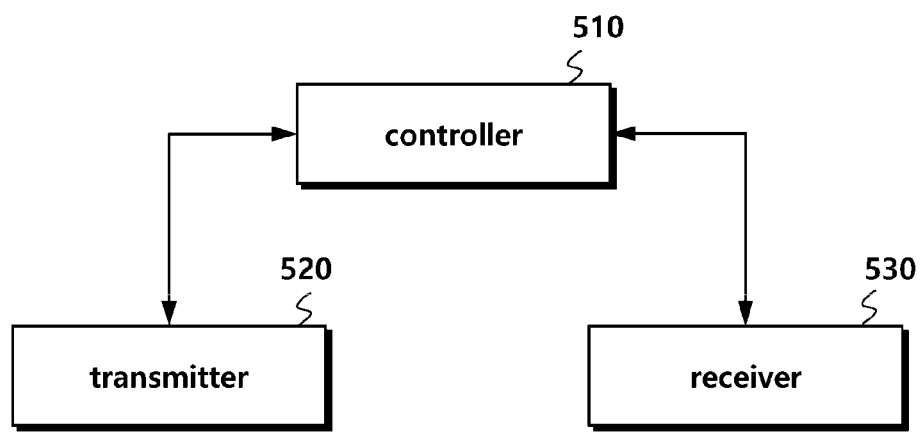
FIG. 5 is a block diagram illustrating a UE according to an embodiment.

FIG. 5 is a block diagram illustrating a UE according to an embodiment.

Referring to FIG. 5, a UE 500 may include a receiver 530 for receiving indicating information indicating a state change into a specific RRC state from an eNB, and a controller 510 for configuring a connection state of the UE as the specific RRC state based on the indication information and performing a cell reselection operation according to a movement of the UE, and the controller 510 may change the connection state of the UE into an RRC idle state based on at least one piece of information on whether an RRC resume procedure is initiated, system information of a cell selected by the cell reselection operation, and radio access technology information.

For example, the specific RRC state is distinguished from an RRC connection state and the RRC idle state and refers to a light connection state or an RRC inactive state in which UE context of the UE is stored and an RAN initiation paging operation is supported.

UE 500 further includes a transmitter 520 configured to transmit information indicating that the UE 500 supports the specific RRC state to the eNB. For example, the transmitter 520 may transmit information indicating that the corresponding UE 500 configures the specific RRC state to the eNB through UE capability.

Meanwhile, when receiving indication information indicating a change in the connection state into the specific RRC state from the eNB, the controller 510 may change the connection state of the UE 500 into the specific RRC state. For example, the controller 510 may change settings of the UE such that the RRC connection state is changed into the specific RRC state. In another example, the controller 510 may store UE context, support RAN initiation paging, and suspend all SRBs and DRBs to configure the specific RRC state.

Further, the UE 500 may move in the specific RRC state. For example, the controller 510 of the UE 500 in the specific RRC state may perform a cell reselection operation according to a movement. When a radio quality of the cell having configured the specific RRC state deteriorates, the controller 510 may perform the cell reselection operation in consideration of states of other cells.

In addition, the controller 510 may change the connection state of the UE from the specific RRC state into the RRC idle state or the RRC connection state according to a movement of the UE 500.

For example, when system information does not contain information supporting the specific RRC state, the controller 510 may change the connection state of the UE into the RRC idle state. Specifically, the receiver 530 may receive system information of the cell reselected by the cell reselection operation, and the controller 510 may identify whether the reselected cell supports the specific RRC state based on the received system information. When the reselected cell does not support the specific RRC state, the controller 510 may change the specific RRC state into the RRC idle state. Accordingly, such operation of UE 500 may resolve connection state ambiguity of the UE that may be generated due to non-supporting of the specific RRC state by the reselected cell.

In another example, when radio access technology of the cell selected by the cell reselection operation is different from that of the cell having configured the specific RRC state, the controller 510 may change the connection state of the UE 500 into the RRC idle state. Specifically, the controller 510 may identify radio access technology of the reselected cell, and, when the corresponding radio access technology is changed from that of the previously accessed cell, change the connection state of the UE 500 into the RRC idle state. For example, when the cell having configured the connection state as the specific RRC connection state uses E-UTRAN-based radio access technology and the cell reselected by the movement uses radio access technology different therefrom such as Wi-Fi or 3G, the UE may change the connection state into the RRC idle state.

In another example, when the UE 500 initiates the RRC resume procedure for the transition to the RRC connection state before the cell reselection operation, the controller 510 may change the connection state of the UE 500 into the RRC idle state. Specifically, the controller 510 may perform the RRC resume procedure to perform the transition from the specific RRC state to the RRC connection state. For example, when outgoing data (MO data) is generated in the UE 500 in the specific RRC state, the controller 510 may change the state of the UE 500 into the RRC connection state by performing the RRC resume procedure. However, when outgoing data is generated in the UE 500 in the specific RRC state or when the UE 500 having initiated the RRC resume procedure reselects a cell according to a movement, the controller 510 may change the connection state into the RRC idle state.

Meanwhile, when the UE 500 escapes from an RAN initiation paging area or when system information contains information supporting the specific RRC state, the controller 510 may perform a paging area update. For example, the UE 500 may escape from the RAN initiation paging area of the eNB having configured the specific RRC state according to a movement. In this case, the controller 510 may identify system information of the reselected cell and identify whether the system information contains information indicating supporting of the specific RRC state. When the reselected cell supports the specific RRC state, the controller 510 may update the paging area. The controller 510 may maintain the specific RRC state as necessary.

In addition, the receiver 530 may receive downlink control information, data, or messages from the eNB through a corresponding channel. The controller 510 controls the general operation of the UE 500 for changing the connection state of the UE according to a movement of the UE in the specific RRC state. The transmitter 520 transmits uplink control information, data, and messages to the eNB through a corresponding channel.

Figure 6:
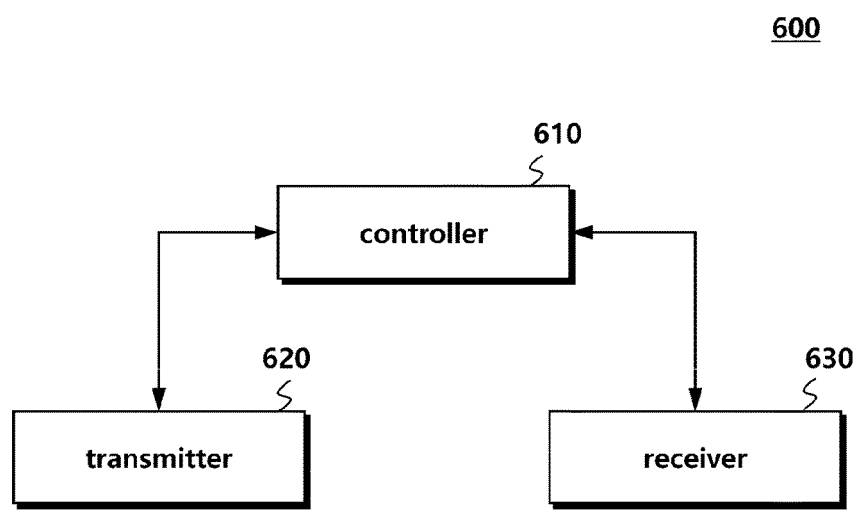
FIG. 6 is a block diagram illustrating an eNB according to an embodiment.

FIG. 6 is a block diagram illustrating an eNB according to an embodiment.

Referring to FIG. 6, an eNB 600 may include a transmitter 620 for transmitting information on whether a cell provided by the corresponding eNB supports a specific RRC state through system information and transmitting indication information indicating a state change into the specific RRC state to a UE within the cell provided by the eNB, and a controller 610 for configuring a connection state of the UE into the specific RRC state.

For example, the specific RRC state is distinguished from an RRC connection state and an RRC idle state and refers to a light connection state or an RRC inactive state in which UE context of the UE is stored and an RAN initiation paging operation is supported.

Meanwhile, the transmitter 620 may transmit information indicating whether the cell provided by the corresponding eNB supports the specific RRC state through the system information. The UE may receive the system information and thus identify whether the corresponding cell supports the specific RRC state.

Further, the transmitter 620 may transmit the indication information through an RRC message. In this case, a receiver 630 may receive UE capability information containing information on whether the UE supports the specific RRC state and recognize that the corresponding UE supports the specific RRC state.

The controller 610 may change the connection state of the UE into the specific RRC state. For example, the controller 610 may change settings such that the corresponding UE changes from the RRC connection state to the specific RRC state. In another example, the controller 610 may store UE context, support RAN initiation paging, and suspend all SRBs and DRBs to configure the corresponding UE as in the specific RRC state.

Meanwhile, the UE may move in the specific RRC state. For example, the UE in the specific RRC state may perform a cell reselection operation according to a movement of the UE. When a radio quality of the cell having configured the specific RRC state deteriorates, the UE may perform the cell reselection operation in consideration of states of other cells.

The UE in the specific RRC state may change the connection state of the UE into the RRC idle state based on at least one piece of information on whether an RRC resume procedure is initiated, system information of the cell selected by the cell reselection operation, and radio access technology information.

For example, when the system information does not contain information supporting the specific RRC state, the UE may change the connection state of the UE into the RRC idle state. Specifically, the UE may receive system information of the cell reselected by the cell reselection operation and identify whether the reselected cell supports the specific RRC state based on the received system information. When the reselected cell does not support the specific RRC state, the UE may change the specific RRC state into the RRC idle state.

In another example, when radio access technology of the cell selected by the cell reselection operation is different from that of the cell having configured the specific RRC state, the UE may change the connection state of the UE into the RRC idle state. Specifically, the UE may identify radio access technology of the reselected cell, and, when the corresponding radio access technology is changed from that of the previously accessed cell, change the connection state of the UE into the RRC idle state. For example, when the cell having configured the connection state as the specific RRC connection state uses E-UTRAN-based radio access technology and the cell reselected by the movement uses radio access technology different therefrom such as Wi-Fi or 3G, the UE may change the connection state into the RRC idle state.

In another example, when the UE initiates the RRC resume procedure for the transition to the RRC connection state before the cell reselection operation, the UE may change the connection state of the UE into the RRC idle state. Specifically, the UE may perform the RRC resume procedure to perform the transition from the specific RRC state to the RRC connection state. For example, when outgoing data (MO data) is generated in the UE in the specific RRC state, the UE may change the state of the UE into the RRC connection state by performing the RRC resume procedure. However, when outgoing data is generated in the UE in the specific RRC state or when the UE having initiated the RRC resume procedure reselects a cell according to a movement of the UE, the UE may change the connection state into the RRC idle state.

Meanwhile, when the UE escapes from an RAN initiation paging area or when system information contains information supporting the specific RRC state, the UE may perform a paging area update. For example, the UE may escape from the RAN initiation paging area of the eNB having configured the specific RRC state according to a movement. In this case, the UE may identify system information of the reselected cell and identify whether the system information contains information indicating the supporting of the specific RRC state. When the reselected cell supports the specific RRC state, the UE may update the paging area. The UE may maintain the specific RRC state as necessary.

In addition, the controller 610 controls the configuration of the specific RRC state of the eNB required for implementing the above-described present embodiments, the connection state transition according to a movement of the UE, and the general operation of the eNB 600 for paging message processing.

The transmitter 620 and the receiver 630 are used for transmitting/receiving signals, messages, or data required for implementing the above-described present embodiments to/from the UE.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

The above embodiments of the present disclosure have been described only for illustrative purposes, and those skilled in the art will appreciate that various modifications and changes may be made thereto without departing from the scope and spirit of the invention. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. A method of changing a connection state by a User Equipment (UE), the method comprising:
   receiving indication information indicating a connection change into a specific RRC state from a Base Station (BS);
   configuring a connection state of the UE into the specific RRC state based on the indication information and performing a cell reselection operation according to a movement of the UE; and changing the connection state of the UE into an RRC idle state based on at least one piece of i) information on whether an RRC resume procedure is initiated, ii) system information of a cell selected by the cell reselection operation, and iii) radio access technology information, wherein the specific RRC state is a state distinguished from an RRC connection state and the RRC idle state;

wherein the specific RRC state is a light connection state or an RRC inactive state in which an S1 connection is maintained between the BS and a core network entity for the specific RRC state; and wherein the changing of the connection state comprises, when a PLMN id of the cell selected by the cell reselection operation is different from a PLMN id of a cell having configured the specific RRC state, changing the connection state of the UE into the RRC idle state.

2. The method of claim 1, wherein the specific RRC state is the light connection state or the RRC inactive state in which UE context of the UE is stored and an RAN initiation paging operation is supported.

3. The method of claim 1, wherein the changing of the connection state comprises, when radio access technology of the cell selected by the cell reselection operation is different from that of the cell having configured the specific RRC state, changing the connection state of the UE into the RRC idle state.

4. The method of claim 1, wherein the changing of the connection state comprises, when the UE initiates the RRC resume procedure for a transition to the RRC connection state before the cell reselection operation, changing the connection state of the UE into the RRC idle state.

5. A method of controlling a change in a connection state of a User Equipment (UE) by a Base Station (BS), the method comprising:

transmitting information on whether a corresponding cell provided by the BS supports a specific RRC state through system information;

transmitting indication information indicating a state change into the specific RRC state to a UE within the corresponding cell; and configuring the connection state of the UE as the specific RRC state, wherein the specific RRC state is a state distinguished from an RRC connection state and an RRC idle state;

wherein the specific RRC state is a light connection state or an RRC inactive state in which an S1 connection is maintained between the BS and a core network entity for the specific RRC state; and wherein the UE in the specific RRC state is configured to:
perform a cell reselection operation according to a movement of the UE;
change the specific RRC state into the RRC idle state when a PLMN id of a cell selected by the cell reselection operation is different from a PLMN id of the cell having configured the specific RRC state.

6. The method of claim 5, wherein the specific RRC state is the light connection state or the RRC inactive state in which UE context of the UE is stored and an RAN initiation paging operation is supported.

7. The method of claim 5, wherein when radio access technology of the cell selected by the cell reselection operation is different from that of the cell provided by the BS, the UE in the specific RRC state changes the connection state of the UE into the RRC idle state.

8. A User Equipment (UE) for changing a connection state, the UE comprising:

a receiver configured to receive indication information indicating a state change into a specific RRC state from a Base Station (BS); and a controller configured to configure a connection state of the UE as the specific RRC state based on the indication information and perform a cell reselection operation according to a movement of the UE, wherein the controller changes the connection state of the UE into an RRC idle state based on at least one piece of i) information on whether an RRC resume procedure is initiated, ii) system information of a cell selected by the cell reselection operation, and iii) radio access technology information;

wherein the specific RRC state is a state distinguished from an RRC connection state and the RRC idle state;

wherein the specific RRC state is a light connection state or an RRC inactive state in which an S1 connection is maintained between the BS and a core network entity for the specific RRC state; and wherein when a PLMN id of the cell selected by the cell reselection operation is different from a PLMN id of a cell having configured the specific RRC state, the controller changes the connection state of the UE into the RRC idle state.

9. The UE of claim 8, wherein the specific RRC state is the light connection state or the RRC inactive state in which UE context of the UE is stored and an RAN initiation paging operation is supported.

10. The UE of claim 8, wherein, when radio access technology of the cell selected by the cell reselection operation is different from that of the cell having configured the specific RRC state, the controller changes the connection state of the UE into the RRC idle state.

11. The UE of claim 8, wherein, when the UE initiates the RRC resume procedure for a transition to the RRC connection state before the cell reselection operation, the controller changes the connection state of the UE into the RRC idle state.

* * * * *